United States Patent
Calderin et al.

(10) Patent No.: US 12,401,386 B2
(45) Date of Patent: Aug. 26, 2025

(54) ELECTRONIC DEVICE WITH COUPLERS FOR POWER WAVE DETECTION IN MULTIPLE REFERENCE PLANES

(71) Applicant: Apple Inc., Cupertino, CA (US)

(72) Inventors: Lucas Calderin, San Francisco, CA (US); Zhengan Yang, Del Mar, CA (US)

(*) Notice: Subject to any disclaimer, the term of this patent is extended or adjusted under 35 U.S.C. 154(b) by 54 days.

(21) Appl. No.: 18/474,127

(22) Filed: Sep. 25, 2023

(65) Prior Publication Data

US 2024/0022283 A1 Jan. 18, 2024

Related U.S. Application Data

(63) Continuation of application No. 17/830,246, filed on Jun. 1, 2022.

(51) Int. Cl.
  *H04B 1/44* (2006.01)
  *H04B 1/04* (2006.01)
  *H04B 17/309* (2015.01)

(52) U.S. Cl.
  CPC ............ *H04B 1/44* (2013.01); *H04B 1/0458* (2013.01); *H04B 17/309* (2015.01)

(58) Field of Classification Search
  CPC ........................................................ H04B 1/44
  See application file for complete search history.

(56) References Cited

U.S. PATENT DOCUMENTS

| | | |
|---|---|---|
| 5,995,821 A | 11/1999 | Tran |
| 7,199,678 B2 | 4/2007 | Matsuno |
| 8,351,874 B2 | 1/2013 | Dent et al. |
| 9,070,537 B2 | 6/2015 | Yuzurihara et al. |
| 9,450,553 B2 | 9/2016 | Langer et al. |
| 9,594,147 B2 | 3/2017 | Han et al. |
| 10,135,549 B2 | 11/2018 | Adolf et al. |
| 10,156,615 B2 | 12/2018 | Habara et al. |
| 10,236,831 B2 | 3/2019 | Khesbak et al. |

(Continued)

FOREIGN PATENT DOCUMENTS

| | | |
|---|---|---|
| KR | 20010020244 A | 3/2001 |
| KR | 20130070447 A | 6/2013 |

(Continued)

*Primary Examiner* — Hsinchun Liao
(74) *Attorney, Agent, or Firm* — Treyz Law Group, P.C.; Michael H. Lyons (57) ABSTRACT

An electronic device may include signal transmission circuitry having a signal path and a signal source that transmits a signal on the signal path. First and second signal couplers may be coupled to the signal path. Control circuitry may use the first signal coupler to measure the signal at a first reference plane and may use the second signal coupler to concurrently measure the signal at a second reference plane. The signal measurements may include power wave, forward wave, reverse wave, impedance, and/or delivered power measurements. Terminations in the signal couplers may be adjusted to dynamically shift the reference planes. The first and second signal couplers may be formed from first and third metallization layers on a stacked dielectric substrate, where the signal path is formed from a second metallization layer. Additional signal couplers may be coupled to the signal path for concurrently measuring additional reference planes.

20 Claims, 7 Drawing Sheets

(56) References Cited

U.S. PATENT DOCUMENTS

| | | | |
|---|---|---|---|
| 10,551,422 B2 | 2/2020 | Hiraga | |
| 10,969,421 B2 | 4/2021 | Anderson et al. | |
| 2016/0211928 A1 | 7/2016 | Brewer et al. | |
| 2016/0238447 A1* | 8/2016 | Cho | G01J 3/0224 |
| 2017/0092412 A1* | 3/2017 | Manusharow | H01F 27/24 |
| 2017/0352947 A1 | 12/2017 | Solomko et al. | |
| 2022/0045554 A1 | 2/2022 | Leabman | |

FOREIGN PATENT DOCUMENTS

| | | |
|---|---|---|
| KR | 20160147975 A | 12/2016 |
| KR | 20170039598 A | 4/2017 |
| KR | 20170093208 A | 8/2017 |
| KR | 20190011324 A | 2/2019 |

\* cited by examiner

ELECTRONIC DEVICE WITH COUPLERS FOR POWER WAVE DETECTION IN MULTIPLE REFERENCE PLANES

This application is a continuation of U.S. patent application Ser. No. 17/830,246, filed Jun. 1, 2022, which is hereby incorporated by reference herein in its entirety.

FIELD

This disclosure relates generally to electronic devices and, more particularly, to electronic devices with circuitry for transmitting signals.

BACKGROUND

Electronic devices can be provided with signal transmission capabilities in which a signal is transmitted onto an output load via a signal path. Electronic devices with signal transmission capabilities include wireless electronic devices having a wireless transmitter that transmits radio-frequency signals onto an output load such as an antenna. It can be desirable to be able to measure one or more characteristics of the signal path using the transmitted signal.

SUMMARY

An electronic device may include signal transmission circuitry having a signal source, a signal path, an output node coupled, and an output load. For example, the signal transmission circuitry may be part of wireless circuitry in the electronic device, the signal source may be a power amplifier, and the output load may be an antenna. The signal source may transmit a signal to the output load over the signal path.

A multi-coupler may be disposed along the signal path. The multi-coupler may include at least a first signal coupler and a second signal coupler. Each signal coupler may be used to measure the signal within a respective reference plane along the signal path. The first signal coupler may have one or more terminations with first impedances. The first impedances may configure the first signal coupler to exhibit a first reference plane along the signal path. The second signal coupler may have one or more terminations with second impedances that are different from the first impedances. The second impedances may configure the second coupler to exhibit a second reference plane along the signal path that is different from the first reference plane. The first and second signal couplers may include power detectors or may include switching circuitry for measuring forward and reverse waves.

One or more processors may use the first signal coupler to measure the signal at the first reference plane along the signal path. The one or more processors may use the second signal coupler to measure the signal at the second reference plane along the signal path concurrent with measurement of the signal at the first reference plane using the first signal coupler. The signal measurements may include power wave measurements, forward wave measurements, reverse wave measurements, impedance measurements, and/or delivered power measurements, as examples. The impedances of the termination(s) in the signal couplers may be adjusted to dynamically shift the location of the corresponding reference planes on the signal path over time. To maximize isolation of the first and second signal couplers, the first and second signal couplers and the signal path may be distributed between metallization layers on a stacked dielectric substrate. The multi-coupler may include more than two signal couplers for concurrently measuring additional reference planes along the signal path.

An aspect of the invention provides an electronic device. The electronic device may include a signal source. The electronic device may include an output load coupled to the signal source over a signal path, the signal source being configured to transmit a signal to the output load over the signal path. The electronic device may include a first signal coupler coupled to the signal path and having a first termination with a first impedance. The electronic device may include a second signal coupler coupled to the signal path and having a second termination with a second impedance different from the first impedance.

An aspect of the disclosure provides a method of operating an electronic device. The method can include with a signal source, transmitting a signal along a signal path. The method can include with a first signal coupler coupled to the signal path, measuring a power wave of the signal at a first reference plane along the signal path. The method can include with a second signal coupler coupled to the signal path, measuring a power wave of the signal at a second reference plane along the signal path concurrent with measurement of the power wave at the first reference plane by the first signal coupler, the second reference plane being different from the first reference plane.

An aspect of the disclosure provides an electronic device. The electronic device can include an antenna. The electronic device an include a power amplifier coupled to the antenna over a signal path and configured to transmit a radio-frequency signal on the signal path. The electronic device an include a first signal coupler coupled to the signal path. The electronic device an include a second signal coupler coupled to the signal path. The electronic device an include one or more processors. The one or more processors can be configured to measure the radio-frequency signal at a first reference plane along the signal path using the first signal coupler. The one or more processors can be configured to measure the radio-frequency signal at a second reference plane along the signal path using the second signal coupler concurrent with measurement of the radio-frequency signal at the first reference plane using the first signal coupler, the second reference plane being different from the first reference plane.

DETAILED DESCRIPTION

Figure 1:
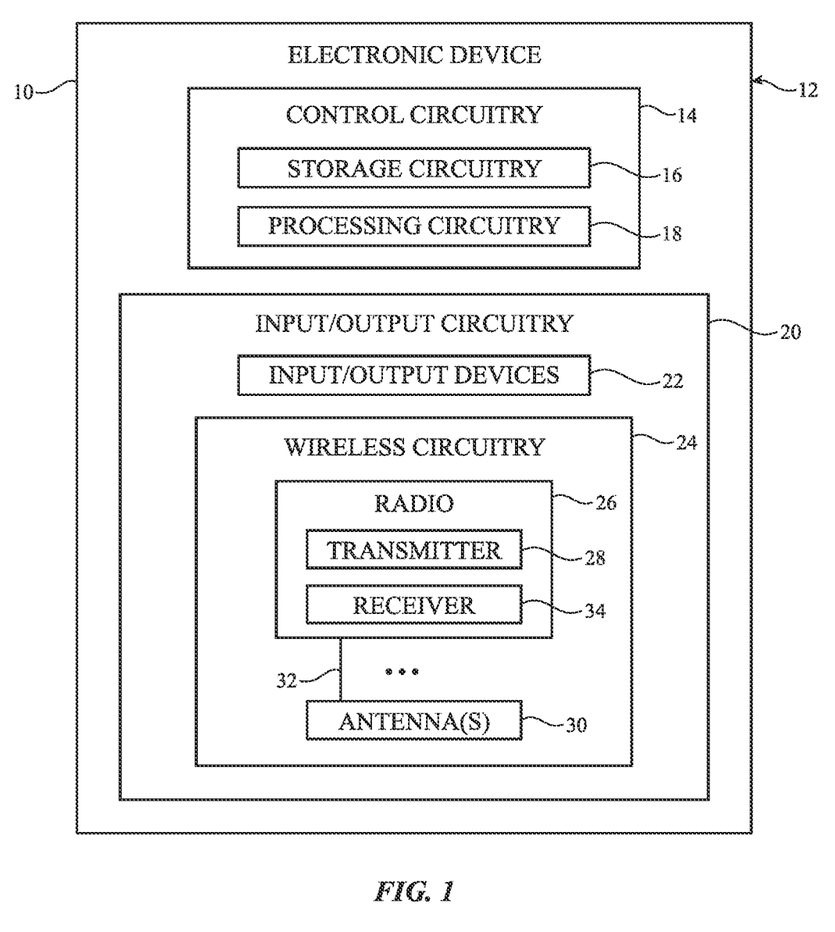
FIG. 1 is a functional block diagram of an illustrative electronic device in accordance with some embodiments.

An electronic device such as device 10 of FIG. 1 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, a networking device, equipment that implements the functionality of two or more of these devices, or other electronic equipment. User equipment device 10 may sometimes be referred to herein as electronic device 10 or simply as device 10.

As shown in the functional block diagram of FIG. 1, device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, parts or all of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more processors, microprocessors, microcontrollers, digital signal processors, host processors, baseband processor integrated circuits, application specific integrated circuits, central processing units (CPUs), graphics processing units (GPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, etc.), antenna diversity protocols, satellite navigation system protocols (e.g., global positioning system (GPS) protocols, global navigation satellite system (GLONASS) protocols, etc.), antenna-based spatial ranging protocols, or any other desired communications protocols. Each communications protocol may be associated with a corresponding radio access technology (RAT) that specifies the physical connection methodology used in implementing the protocol.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), temperature sensors, etc. In some configurations, keyboards, headphones, displays, pointing devices such as trackpads, mice, and joysticks, and other input-output devices may be coupled to device 10 using wired or wireless connections (e.g., some of input-output devices 22 may be peripherals that are coupled to a main processing unit or other portion of device 10 via a wired or wireless link).

Input-output circuitry 20 may include wireless circuitry 24 to support wireless communications. Wireless circuitry 24 (sometimes referred to herein as wireless communications circuitry 24) may include two or more antennas 30. Antennas 30 may be formed using any desired antenna structures for conveying radio-frequency signals. For example, antennas 30 may include antennas with resonating elements that are formed from loop antenna structures, patch antenna structures, inverted-F antenna structures, slot antenna structures, planar inverted-F antenna structures, helical antenna structures, monopole antennas, dipoles, hybrids of these designs, etc. Filter circuitry, switching circuitry, impedance matching circuitry, and/or other antenna tuning components may be adjusted to adjust the frequency response and wireless performance of antennas 30 over time. If desired, two or more of antennas 30 may be integrated into a phased antenna array (sometimes referred to herein as a phased array antenna) in which each of the antennas conveys radio-frequency signals with a respective phase and magnitude that is adjusted over time so the radio-frequency signals constructively and destructively interfere to produce a signal beam in a given pointing direction.

The term "convey radio-frequency signals" as used herein means the transmission and/or reception of the radio-frequency signals (e.g., for performing unidirectional and/or bidirectional wireless communications with external wireless communications equipment). Antennas 30 may transmit the radio-frequency signals by radiating the radio-frequency signals into free space (or to free space through intervening device structures such as a dielectric cover layer). Antennas 30 may additionally or alternatively receive the radio-frequency signals from free space (e.g., through intervening devices structures such as a dielectric cover layer). The transmission and reception of radio-frequency signals by antennas 30 each involve the excitation or resonance of antenna currents on an antenna resonating element in the antenna by the radio-frequency signals within the frequency band(s) of operation of the antenna.

Wireless circuitry 24 may include one or more radios 26. Radio 26 may include circuitry that operates on signals at baseband frequencies (e.g., baseband circuitry) and radio-frequency transceiver circuitry such as one or more radio-frequency transmitters 28 and one or more radio-frequency receivers 34. Transmitter 28 may include signal generator circuitry, modulation circuitry, mixer circuitry for upconverting signals from baseband frequencies to intermediate frequencies and/or radio frequencies, amplifier circuitry such as one or more power amplifiers, digital-to-analog converter (DAC) circuitry, control paths, power supply paths, switching circuitry, filter circuitry, and/or any other circuitry for transmitting radio-frequency signals using antennas 30. Receiver 34 may include demodulation circuitry, mixer circuitry for downconverting signals from intermediate frequencies and/or radio frequencies to baseband frequencies, amplifier circuitry (e.g., one or more low-noise amplifiers (LNAs)), analog-to-digital converter (ADC) circuitry, control paths, power supply paths, signal paths, switching circuitry, filter circuitry, and/or any other circuitry for receiving radio-frequency signals using antennas 30. The components of radio 26 may be mounted onto a single substrate or integrated into a single integrated circuit, chip, package, or system-on-chip (SOC) or may be distributed between multiple substrates, integrated circuits, chips, packages, or SOCs.

Each radio 26 may be coupled to one or more antennas 30 over one or more radio-frequency transmission lines 32. Radio-frequency transmission lines 32 may include coaxial cables, microstrip transmission lines, stripline transmission lines, edge-coupled microstrip transmission lines, edge-coupled stripline transmission lines, transmission lines formed from combinations of transmission lines of these types, etc. Radio-frequency transmission lines 32 may be integrated into rigid and/or flexible printed circuit boards if desired. One or more radio-frequency lines 32 may be shared between multiple radios 26 if desired. Radio-frequency front end (RFFE) modules may be interposed on one or more radio-frequency transmission lines 32. The radio-frequency front end modules may include substrates, integrated circuits, chips, or packages that are separate from radios 26 and may include filter circuitry, switching circuitry, amplifier circuitry, impedance matching circuitry, radio-frequency coupler circuitry, and/or any other desired radio-frequency circuitry for operating on the radio-frequency signals conveyed over radio-frequency transmission lines 32.

Radio 26 may transmit and/or receive radio-frequency signals within corresponding frequency bands at radio frequencies (sometimes referred to herein as communications bands or simply as "bands"). The frequency bands handled by radio 26 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), other centimeter or millimeter wave frequency bands between 10-300 GHz, near-field communications frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

While control circuitry 14 is shown separately from wireless circuitry 24 in the example of FIG. 1 for the sake of clarity, wireless circuitry 24 may include processing circuitry (e.g., one or more processors) that forms a part of processing circuitry 18 and/or storage circuitry that forms a part of storage circuitry 16 of control circuitry 14 (e.g., portions of control circuitry 14 may be implemented on wireless circuitry 24). As an example, control circuitry 14 may include baseband circuitry (e.g., one or more baseband processors), digital control circuitry, analog control circuitry, and/or other control circuitry that forms part of radio 26. The baseband circuitry may, for example, access a communication protocol stack on control circuitry 14 (e.g., storage circuitry 16) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum layer. If desired, the PHY layer operations may additionally or alternatively be performed by radio-frequency (RF) interface circuitry in wireless circuitry 24.

Electronic devices such as device 10 may include circuitry that transmits signals. This circuitry includes a signal source, which can be modeled as an arbitrary source impedance having a source power, that is coupled to an output node over a signal path. The output node may be coupled to an output load having an output impedance. In signal transmission systems such as these, it may be desirable to be able to perform measurements of the transmit signals at the output node. For example, measurements of power of the transmitted signals at the output node can be used to characterize the performance of the output load, which can then be used to calibrate subsequent signal transmissions, to adjust circuitry in device 10, or to perform other actions.

When the performance of the output load is characterized, measurements are performed at a single reference plane along the signal path (i.e., at the output node). Rather than only characterizing the performance of a single reference plane, it may be desirable to be able to characterize the performance of two or more locations along the signal path concurrently (e.g., simultaneously). This may, for example, allow the device to obtain robust real-time knowledge of the performance of the signal path itself, which can then be used to modify device operations to ensure that the signal path operates as expected over the lifespan of device 10. The performance of the signal path may be characterized by measuring forward and/or reverse waves along the signal path, impedances (e.g., ratios of forward and reverse waves), and/or delivered powers (e.g., expressions involving forward waves and impedances) concurrently at multiple reference planes along the signal path.

In some implementations, a single signal coupler is disposed along the signal path for performing measurements at a single reference plane along the signal path. Depending on the measured quantities and the desired reference planes, different terminations and devices may be needed to perform measurements of multiple different reference planes. As such, a single signal coupler is unable to perform concurrent measurements at multiple reference planes along the signal path. While the signal coupler may perform sequential measurements at multiple reference planes (e.g., by measuring a first reference plane, reconfiguring a termination in the signal coupler, and then measuring a second reference plane associated with the reconfigured termination), sequential measurements are impractical due to the dynamic nature of the signal. To mitigate these issues and to allow concurrent characterization of multiple reference planes along the signal path, multi-coupler circuitry may be disposed along the signal path.

Figure 2:
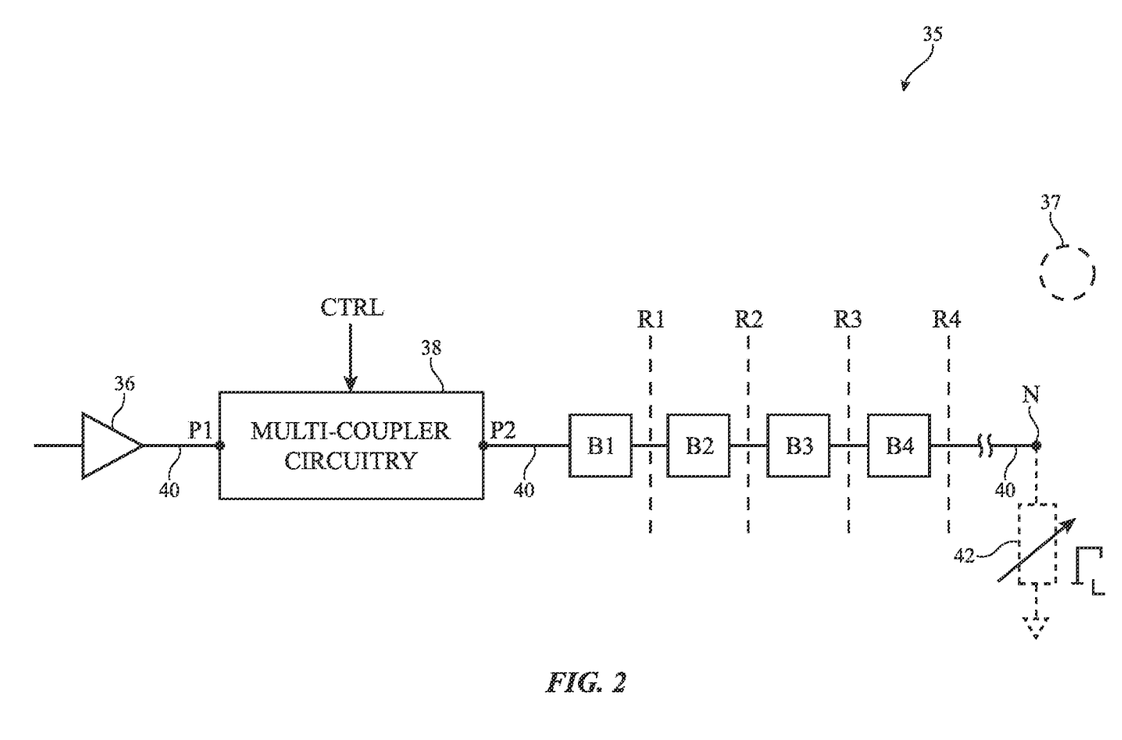
FIG. 2 is a diagram of illustrative signal transmission circuitry having multi-coupler circuitry for concurrently measuring multiple reference planes along a signal path in accordance with some embodiments.

FIG. 2 is a diagram showing how device 10 may include signal transmission circuitry 35 having multi-coupler circuitry for concurrently characterizing multiple reference planes along the signal path. As shown in FIG. 2, signal transmission circuitry 35 may include a signal source 36 having a source impedance and a source power. Signal source 36 may be coupled to output node N over signal path 40. Output node N may be coupled to an output load 42 (e.g., over a portion of signal path 34). Signal source 36 may transmit signals to output node N over signal path 40.

Signal path 40 may sometimes also be referred to herein as signal line 40, signal conductor 40, or signal chain 40. Signal transmission circuitry 35 may, as one example, form a part of wireless circuitry 24 (FIG. 1). In this example, signal source 36 may be a power amplifier (e.g., in transmitter 28 of FIG. 1), signal path 40 may be a radio-frequency transmission line (e.g., a signal conductor of radio-frequency transmission line 32 of FIG. 1), and output load 42 may be a corresponding antenna (e.g., antenna 30 of FIG. 1). Signal source 36 may therefore sometimes be referred to herein as power amplifier (PA) 36 and signal path 40 may sometimes also be referred to herein as transmission line 40. Power amplifier 36 may transmit radio-frequency signals over signal path 40 and antenna 30. While implementations in which signal transmission circuitry 35 forms a part of wireless circuitry 24 for transmitting radio-frequency signals over antenna 30 are described herein as an example, signal transmission circuitry 35 may, in general, include any desired passive signal transmission circuitry in device 10 in addition to signal source 36 (e.g., for transmitting signals at any frequencies between different boards, packages, nodes, chips, integrated circuits, processors, components, accessories, devices such as device 10, etc.). The systems and methods for measuring output power levels and otherwise characterizing the performance of signal path 40 when signal transmission circuitry 35 forms a part of wireless circuitry 24 for transmitting radio-frequency signals over antenna 30 as described herein may be similarly applied in any of these signal transmission contexts.

Output load 42 may have an impedance. The impedance of output load 42 may vary (e.g., at a given frequency) due to changes in environmental conditions around output load 42, such as when an external object 37 approaches the output load. In examples where output load 42 is an antenna, external object 37 (e.g., a user's hand or other body part) may externally load the antenna, causing the antenna to become detuned and producing an impedance discontinuity between output node N and signal path 40. This impedance discontinuity may cause a relatively large amount of the transmitted signal power to be reflected back towards power amplifier 36 from output node N, reducing the overall efficiency of the antenna. By measuring a power wave of the signal at node N, signal transmission circuitry 35 may measure (e.g., detect) the impedance of output load 42 (e.g., as subject to external loading by external object 37) and may use this information to adjust impedance matching circuitry for the antenna, to adjust tuning of the antenna, to reduce transmit power level of power amplifier 36 (e.g., to comply with regulatory limits on radio-frequency energy exposure or absorption), and/or to perform any other desired operations to characterize the performance of output load 42 or to mitigate loading by external object 37. In general, the impedance of output load 42 is a complex value and may be characterized by the complex reflection coefficient $\Gamma_L$. Reflection coefficient $\Gamma_L$ may have a relatively high magnitude when a relatively large impedance discontinuity at output node N causes a relatively large amount of the transmitted signal power to be reflected back towards power amplifier 36, for example.

In practice, it may be desirable to measure the signal at multiple different points (referred to herein as reference planes R) along signal path 40. There may, for example, be one or more circuit blocks B interposed along signal path 40 between signal source 36 and output node N (e.g., circuit blocks for performing one or more functions of device 10 that may or may not be associated with the transmission of signals at output node N). In the example of FIG. 2, there are at least four circuit blocks B1, B2, B3, and B4 disposed along signal path 40. This is illustrative and, in general, there may be only one circuit block B1, two circuit blocks B1 and B2, three circuit blocks B1, B2, and B3, or more than four circuit blocks B disposed along signal path 40. Circuit blocks B may include, for example, passive devices, capacitors, inductors, resistors, impedance matching circuitry, antenna tuning circuitry, routing circuitry, transmission lines, switches, filters, other couplers coupled to radio-frequency front end circuitry, transmit/receive (TR) switches connected to other radio-frequency front end circuitry, etc.

The performance of one or more circuit blocks B may be characterized by measuring the power wave of the signal along signal path 40 at reference planes located before, after, and/or between circuit blocks B. For example, at a first reference plane R1 between circuit blocks B1 and B2, a second reference plane R2 between circuit blocks B2 and B3, a reference plane R3 between circuit blocks B3 and B4, and/or at a fourth reference plane R5 after circuit block B4. The overall performance of signal path 40 may be characterized by concurrently measuring the power wave of the signal along signal path 40 at two or more of reference planes R1-R4. One or more of reference planes R1-R4 may be located elsewhere along signal path 40 if desired (e.g., at the output of signal source 36, at the input of circuit block B1, within circuit blocks B1, B2, B3, and/or B4, etc.).

Signal transmission circuitry 35 may include signal coupler circuitry interposed on signal path 40 between signal source 36 and circuit block B1 such as multi-coupler circuitry 38. If desired, one or more circuit blocks B may be interposed on signal path 40 between signal source 46 and multi-coupler circuitry 38. Multi-coupler circuitry 38 may have a first port P1 communicably coupled to the output of signal source 36 over a first portion of signal path 40 and may have a second port P2 communicably coupled to node N over a second portion of signal path 40 (e.g., via circuit blocks B1-B4). Multi-coupler circuitry 38 may include two or more signal couplers. Each signal coupler in multi-coupler circuitry 38 may be used to concurrently measure a signal along signal path 40 (e.g., a power wave, forward wave, reverse wave, etc.) within a respective one of reference planes R1-R4. For example, multi-coupler circuitry 38 may include a first signal coupler that measures the signal at reference plane R1, a second signal coupler that concurrently measures the signal at reference plane R2, a third signal coupler that concurrently measures the signal at reference plane R3, and/or a fourth signal coupler that concurrently measures the signal at reference plane R4. Multi-coupler circuitry 38 may include more than four signal couplers when more than four reference planes are concurrently measured. Each signal coupler in multi-coupler circuitry 38 may overlap the same segment of signal path 40 or, if desired, may overlap different respective segments of signal path 40. Multi-coupler circuitry 38 may also include power detectors, voltage detectors, and/or signal receivers that are used to perform measurements using the two or more signal couplers in multi-coupler circuitry 38. Each signal coupler may include one or two corresponding terminations.

Multi-coupler circuitry 38 may receive control signals CTRL (e.g., from control circuitry 14 of FIG. 1). If desired, control signals CTRL may control switches in one or more of the signal couplers to control whether the signal coupler measures a forward wave or a reverse wave within its corresponding reference plane. Control signals CTRL may additionally or alternatively adjust an impedance of one or more of the terminations for one or more of the signal couplers in multi-coupler circuitry 38 to dynamically adjust the location of the corresponding reference plane R over time (e.g., the location of reference planes R1, R2, R3, and/or R4 along signal path 40 may be adjusted over time). The measurements of the signal concurrently gathered from reference planes R1, R2, R3, and/or R4 may be used to characterize the performance of one or more of circuit blocks B1-B4, signal source 36, output load 42, and/or to characterize the performance of signal path 40 as a whole. If desired, the characterized performance may be used to perform adjustments to signal source 36, one or more of circuit blocks B1-B4, and/or output load 42 (e.g., to compensate for any non-idealities detected along signal path 40 via concurrent measurement of two or more of reference planes R1-R4).

Figure 3:
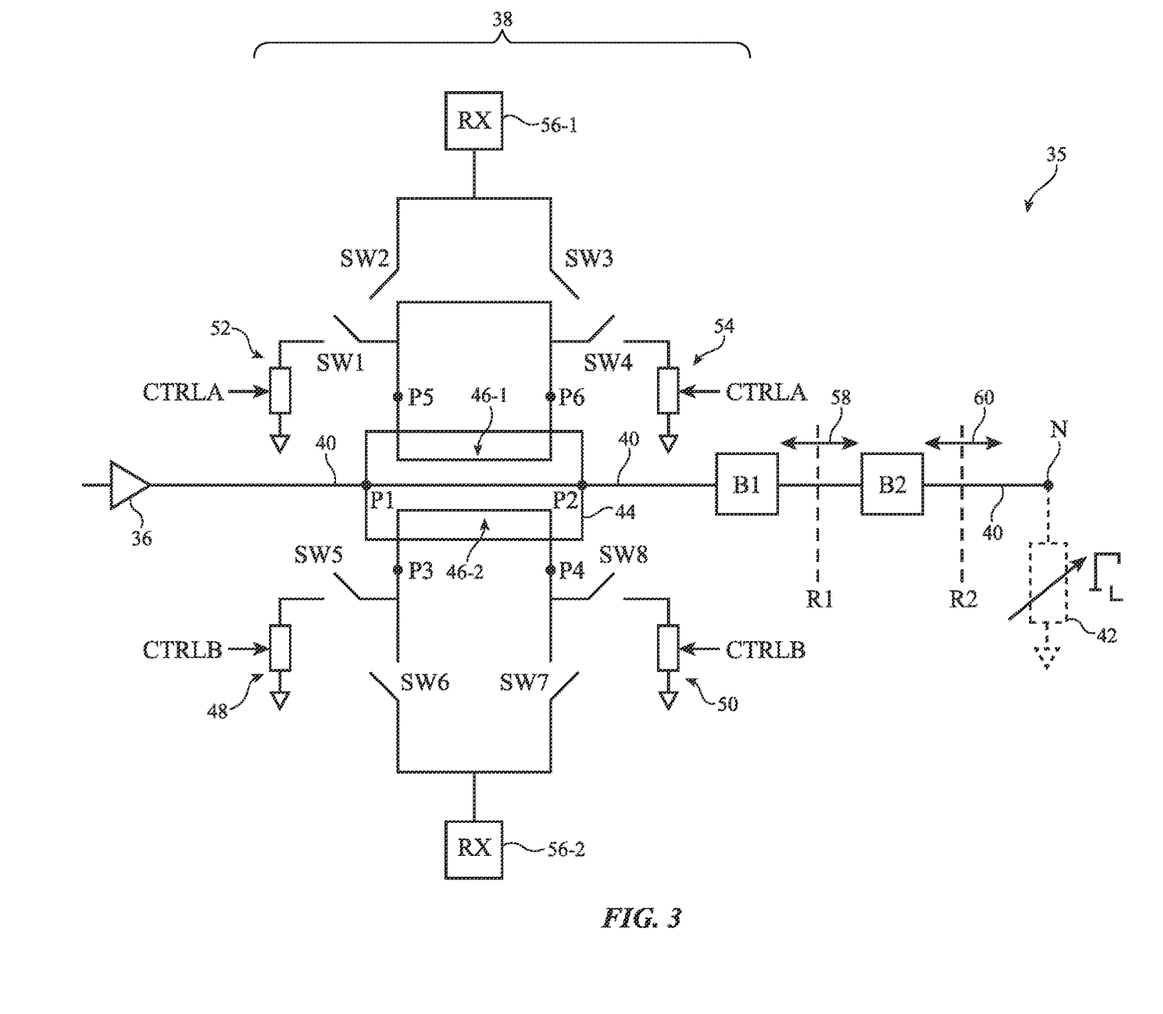
FIG. 3 is a circuit diagram of illustrative multi-coupler circuitry that can measure both forward and reverse waves at first and second reference planes along a signal path in accordance with some embodiments.

FIG. 3 is a circuit diagram showing one example in which multi-coupler circuitry 38 includes two signal couplers for concurrently measuring the signal along transmission line 40 at (within) reference planes R1 and R2. As shown in FIG. 3, multi-coupler circuitry 38 may include a first signal coupler 46-1 and a second signal coupler 46-2. Signal couplers 46-1 and 46-2 may sometimes be collectively referred to herein as multi-coupler 44 or dual coupler 44. Signal couplers 46-1 and 46-2 may include transmission line structures, inductive structures, capacitive structures, transformers, or any other desired type of structures that couple signal off of signal path 40 for further processing (e.g., signal couplers 46-1 and 46-2 may be transmission line couplers, inductive couplers, capacitive couplers, etc.). Signal couplers 46-1 and 46-2 may share ports P1 and P2 of multi-coupler circuitry 38.

During signal transmission, signal source 36 may transmit signals (e.g., radio-frequency signals) on signal path 40. These signals may sometimes be referred to as forward wave (FW) signals. The energy of the FW signals into port P1 may be characterized by coefficient $a_1$ (e.g., in a four-port network model of the system). The energy (power wave) of the FW signals out of port P2 may be characterized by a coefficient $b_2$ (e.g., the magnitude of the signal wave of the FW signals in the four-port network model). During signal transmission, some of the FW signals will reflect off of output node N or other components along signal path 40 (e.g., circuit blocks B1 or B2) and back towards multi-coupler circuitry 38 (e.g., due to impedance discontinuities along signal path 40 at circuit blocks B1 or B2 or at node N). These reflected signals may sometimes be referred to as reverse wave (RW) signals.

In the implementation of FIG. 3, signal coupler 46-1 and signal coupler 46-2 are switch-configured couplers that are able to measure the FW signals and the RW signals along signal path 40. As shown in FIG. 3, signal coupler 46-2 may have a third port P3 and a fourth port P4 that are communicably coupled to receiver (RX) 56-2. Port P3 represents the coupled node of signal coupler 46-2 and may therefore sometimes be referred to herein as coupled node P3 or coupled node port P3. Port P4 represents the isolated node of signal coupler 46-2 (e.g., the port/node isolated from the signal source) and may therefore sometimes be referred to herein as isolated node P4 or isolated node port P4. Signal coupler 46-2 may have switching circuitry such as switches SW5, SW6, SW7, and SW8 (sometimes referred to herein as a first set of switches or first switching circuitry). Switch SW6 may couple port P3 to receiver 56-2. Switch SW7 may couple port P4 to receiver 56-2. Switch SW5 may couple port P3 to a termination impedance such as coupled node termination 48. Switch SW8 may couple port P4 to a termination impedance such as isolated node termination 50.

Coupled node termination 48 may have a complex impedance characterized by a corresponding complex reflection coefficient $\Gamma_{T,COUP2}$. Coupled node termination 48 may include one or more resistive, capacitive, inductive, and/or switching components that configure coupled node termination 48 to exhibit the impedance characterized by reflection coefficient $\Gamma_{T,COUP2}$. Isolated node termination 50 may have a complex impedance characterized by a corresponding complex reflection coefficient $\Gamma_{T,ISOL2}$. Isolated node termination 50 may include one or more resistive, capacitive, inductive, and/or switching components that configure isolated node termination 50 to exhibit the impedance characterized by reflection coefficient $\Gamma_{T,ISOL2}$.

Receiver 56-2 may include a power detector, voltage detector, phase detector, mixer, and/or any other desired circuitry for receiving and/or measuring signals coupled off of signal path 40 by signal coupler 46-2. Switches SW5, SW6, SW7, and SW8 (e.g., the first set of switches) may have a first state in which switch SW6 is turned on to couple port P3 to receiver 56-2, switch SW5 is turned off to decouple coupled node termination 48 from port P3, switch SW7 is turned off to decouple port P4 from receiver 56-2, and switch SW8 is turned on to couple port P4 to isolated node termination 50. Switches SW5, SW6, SW7, and SW8 (e.g., the first set of switches) may also have a second state in which switch SW6 is turned off to decouple port P3 from receiver 56-2, switch SW5 is turned on to couple coupled node termination 48 to port P3, switch SW7 is turned on to couple port P4 to receiver 56-2, and switch SW8 is turned off to decouple port P4 from isolated node termination 50.

When described herein as "turned off," "deactivated," or "opened" a given switch SW may form a very high impedance or very low conductance through the switch (e.g., an impedance that exceeds a threshold impedance value or a conductance that is less than a threshold conductance value). When described herein as "turned on," "activated," or "closed" a given switch SW may form a very low impedance or very high conductance through the switch (e.g., an impedance that is less than a threshold impedance value or a conductance that exceeds a threshold conductance value). As an example, switches SW may each be formed using transistors having source, drain, and gate terminals. Each switch may be closed or "turned on" by asserting a gate voltage provided to the gate terminal to provide an electrical connection between its source and drain terminals. Similarly, each switch may be opened or "turned off" by deasserting the gate voltage to provide electrical isolation between its source and drain terminals.

In the first state, signal coupler 46-2 and receiver 56-2 may perform, gather, or measure FW signals (e.g., FW measurements). Signal coupler 46-2 may couple some of the FW signals off of signal path 40 and may pass the FW signals (as well as a portion of the RW signal bouncing off the isolated node termination) to receiver 56-2 via port P3 and switch SW6. Receiver 56-2 may measure the amplitude and/or phase of the FW signals. In the second state, signal coupler 46-2 and receiver 56-2 may perform, gather, or measure RW signals (e.g., RW measurements). Signal coupler 46-2 may couple some of the RW signals off of signal path 40 and may pass the RW signals to receiver 56-2 via port P4 and switch SW7. Receiver 56-2 may measure the amplitude and/or phase of the RW signals.

The impedance of coupled node termination 48 and the impedance of isolated node termination 50 may be selected to configure signal coupler 46-2 and receiver 56-2 to measure the FW signal and/or the RW signal within a corresponding reference plane R2 along signal path 40. In the example of FIG. 3, reference plane R2 is located after circuit block B2 but may, in general, be located anywhere along signal path 40 between signal source 36 and output node N. If desired, reference plane R2 may be located at the output of signal source 36 or at node N. Control circuitry 14 may process the FW signal measurements and/or the RW signal measurements performed using signal coupler 46-2 and receiver 56-2 to characterize (e.g., identify, determine, detect, compute, calculate, measure, etc.) the performance of signal path 40 (e.g., in conveying the signals) at or near the location of reference plane R2 (e.g., to characterize the performance of circuit block B2, to characterize the performance of output load 42, to characterize the performance of signal source 36, etc.). If desired, the control circuitry may characterize (e.g., identify, determine, detect, compute, calculate, measure, etc.) the impedance of signal path 40 at reference plane R2 (e.g., using a ratio of the FW and RW measurements) and/or the forward power wave at reference plane R2 (e.g., using expressions involving the FW measurements and impedances). Control circuitry 14 may use the FW measurements, RW measurements, characterized performance, impedance, and/or delivered power for performing subsequent processing operations, for example.

Because signal coupler 46-1 in multi-coupler circuitry 38 is separate from signal coupler 46-2 and includes different impedance terminations than the impedance terminations of signal coupler 46-2, signal coupler 46-1 may be used to concurrently characterize the signal along signal path 40 within reference plane R1, which is located at a different portion of signal path 40 than reference plane R2. As shown in FIG. 3, signal coupler 46-2 may have a fifth port P5 and a sixth port P6 that are communicably coupled to receiver (RX) 56-1 (e.g., multi-coupler 44 may have six ports P1-P6). Signal coupler 46-1 may partially or completely overlap the same portion of signal path 40 as signal coupler 46-2 (and signal couplers 46-1 and 46-2 may thereby couple signals off the same portion of signal path 40) or may be non-overlapping with respect to signal coupler 46-2.

Port P5 represents the coupled node of signal coupler 46-1 and may therefore sometimes be referred to herein as coupled node P5. Port P6 represents the isolated node of signal coupler 46-1 (e.g., the port/node isolated from the signal source) and may therefore sometimes be referred to herein as isolated node P6. Signal coupler 46-1 may have switching circuitry such as switches SW1, SW2, SW3, and SW4 (sometimes referred to herein as a second set of switches or second switching circuitry). Switch SW2 may couple port P5 to receiver 56-1. Switch SW3 may couple port P6 to receiver 56-1. Switch SW1 may couple port P5 to a termination impedance such as coupled node termination 52. Switch SW4 may couple port P6 to a termination impedance such as isolated node termination 54.

Coupled node termination 52 may have a complex impedance characterized by a corresponding complex reflection coefficient $\Gamma_{T,COUP1}$ that is different from the complex reflection coefficient $\Gamma_{T,COUP2}$ of the coupled node termination 48 of signal coupler 46-2. Coupled node termination 52 may include one or more resistive, capacitive, inductive, and/or switching components that configure coupled node termination 52 to exhibit the impedance characterized by reflection coefficient $\Gamma_{T,COUP1}$. Isolated node termination 54 may have a complex impedance characterized by a corresponding complex reflection coefficient $\Gamma_{T,ISOL1}$ that is different from the complex reflection coefficient $\Gamma_{T,COUP1}$ of the coupled node termination 52 of signal coupler 46-1. Isolated node termination 54 may include one or more resistive, capacitive, inductive, and/or switching components that configure isolated node termination 54 to exhibit the impedance characterized by reflection coefficient $\Gamma_{T,ISOL1}$.

Receiver 56-1 may be the same receiver as the receiver 56-2 used by signal coupler 46-2 or may be a separate receiver. Receiver 56-1 may include a power detector, voltage detector, phase detector, and/or any other desired circuitry for receiving and/or measuring signals coupled off of signal path 40 by signal coupler 46-1. Switches SW1, SW2, SW3, and SW4 (e.g., the second set of switches) may have a first state in which switch SW2 is turned on to couple port P5 to receiver 56-1, switch SW1 is turned off to decouple coupled node termination 52 from port P5, switch SW3 is turned off to decouple port P6 from receiver 56-1, and switch SW4 is turned on to couple port P6 to isolated node termination 54. Switches SW1, SW2, SW3, and SW4 (e.g., the second set of switches) may also have a second state in which switch SW2 is turned off to decouple port P5 from receiver 56-1, switch SW1 is turned on to couple coupled node termination 52 to port P5, switch SW3 is turned on to couple port P6 to receiver 56-1, and switch SW4 is turned off to decouple port P6 from isolated node termination 54. Control circuitry 14 (FIG. 1) may provide control signals (e.g., control signals CTRL of FIG. 2) to multi-coupler circuitry 38 that place switches SW1-SW4 into a selective one of the first or second states. The control signals may also independently place SW5-SW8 of signal coupler 46-2 into a selected one of the first or second states (e.g., signal coupler 46-1 may be toggled between states independent of signal coupler 46-2) for independently and concurrently characterizing reference planes R1 and R2.

In the first state, signal coupler 46-1 and receiver 56-1 may perform, gather, or measure FW signals (e.g., FW measurements). Signal coupler 46-1 may couple some of the FW signals off of signal path 40 and may pass the FW signals (as well as a portion of the RW signal bouncing off isolated node termination 54) to receiver 56-1 via coupled node P5 and switch SW2. Receiver 56-1 may measure the amplitude and/or phase of the FW signals. In the second state, signal coupler 46-1 and receiver 56-1 may perform, gather, or measure RW signals (e.g., RW measurements). Signal coupler 46-1 may couple some of the RW signals off of signal path 40 and may pass the RW signals to receiver 56-1 via port P6 and switch SW3. Receiver 56-1 may measure the amplitude and/or phase of the RW signals.

The impedance of coupled node termination 52 and the impedance of isolated node termination 54 may be selected to configure signal coupler 46-1 and receiver 56-1 to measure the FW signal and/or the RW signal within the corresponding reference plane R1 located elsewhere along signal path 40 than reference plane R2 of signal coupler 46-2. In the example of FIG. 3, reference plane R1 is located between circuit blocks B1 and B2 but may, in general, be located anywhere along signal path 40 between signal source 36 and output node N. If desired, reference plane R1 may be located at the output of signal source 36 or at node N. Control circuitry 14 may process the FW signal measurements and/or the RW signal measurements performed using signal coupler 46-2 and receiver 56-2 to characterize (e.g., identify, determine, detect, compute, calculate, measure, etc.) the performance of signal path 40 (e.g., in conveying the signals) at or near the location of reference plane R1 (e.g., to characterize the performance of circuit block B2, to characterize the performance of output load 42, to characterize the performance of signal source 36, etc.). If desired, the control circuitry may characterize (e.g., identify, determine, detect, compute, calculate, measure, etc.) the impedance of signal path 40 at reference plane R1 (e.g., using a ratio of the FW and RW measurements) and/or the delivered power at reference plane R1 (e.g., using expressions involving the FW measurements and impedances). Control circuitry 14 may use the FW measurements, RW measurements, characterized performance, impedance, and/or delivered power for performing subsequent processing operations, for example.

If desired, control circuitry 14 may process the FW signal measurements and/or the RW signal measurements for both reference plane R1 (as gathered using signal coupler 46-1) and reference plane R2 (as gathered using signal coupler 46-2) to characterize the performance of the same component along signal path 40 (e.g., circuit block B2, which is between reference planes R1 and R2). Multi-coupler circuitry 38 may concurrently characterize two different points along signal path 40 (reference planes R1 and R2), which allows control circuitry 14 to have more complete knowledge of the operation and performance of signal path 40 than in examples where only a single point or reference plane is characterized or measured.

Reference plane R1 and/or reference plane R2 may be adjustable. For example, a control signal CTRLB may be provided to coupled node termination 48 and isolated node termination 50 of signal coupler 46-2 (e.g., within control signals CTRL of FIG. 2). Control signal CTRLB may adjust switching circuitry, inductance(s), resistance(s), and/or capacitance(s) and thus the impedances of coupled node termination 48 and/or isolated node termination 50 to dynamically adjust the location of reference plane R2 along signal path 40 over time, as shown by arrow 60 (e.g., to adjust the location along signal path 40 at which signal coupler 46-2 measures the FW and/or RW). Additionally or alternatively, a control signal CTRLA may be provided to coupled node termination 52 and isolated node termination 54 of signal coupler 46-1 (e.g., within control signals CTRL of FIG. 2). Control signal CTRLA may adjust switching circuitry, inductance(s), resistance(s), and/or capacitance(s) and thus the impedances of coupled node termination 52 and/or isolated node termination 54 to dynamically adjust the location of reference plane R1 along signal path 40 over time, as shown by arrow 58 (e.g., to adjust the location along signal path 40 at which signal coupler 46-2 measures the FW and/or RW). This may allow control circuitry 14 to concurrently measure and characterize multiple reference planes at different locations along signal path 40 overtime (e.g., to allow for a complete and robust characterization of signal path 40). The control signal(s) may also be used to adjust the termination to the correct value in the event that there is some corner variation or temperature variation, which would affect the coupler and circuit blocks B1-B4.

Figure 4:
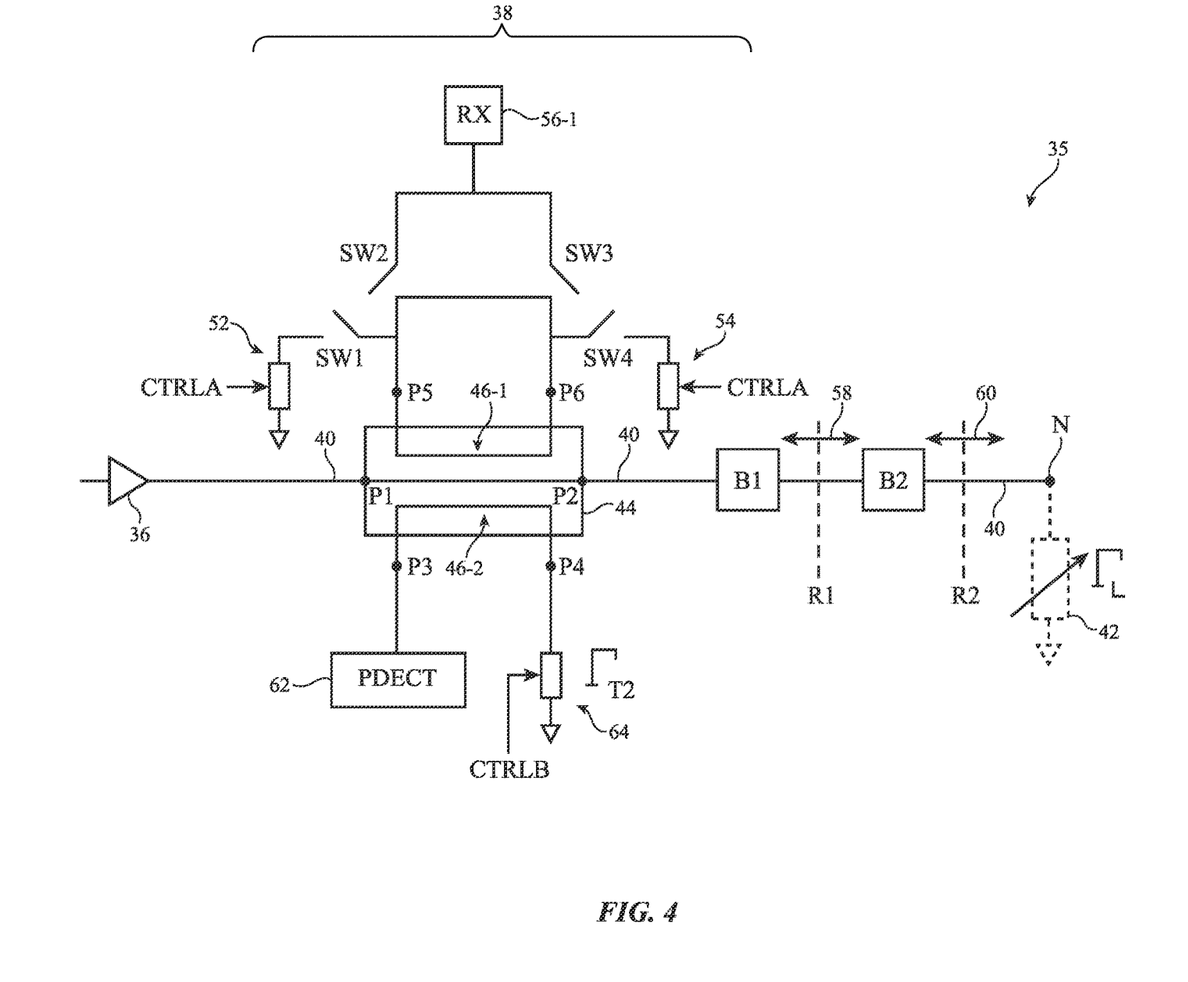
FIG. 4 is a circuit diagram of illustrative multi-coupler circuitry that can measure both forward and reverse waves at a first reference plane and that can measure a power wave at a second reference plane along a signal path in accordance with some embodiments.

The example of FIG. 3 in which signal coupler 46-1 and signal coupler 46-2 both measure FW and RW signals is illustrative. If desired, signal coupler 46-2 may be simplified to only measure power at its corresponding reference plane R2. FIG. 4 is a circuit diagram showing one example of how signal coupler 46-2 may be simplified to only measure power (e.g., power wave) at its corresponding reference plane R2.

As shown in FIG. 4, port P3 of signal coupler 46-2 may be coupled to a power detector such as power detector (PDECT) 62. Port P4 of signal coupler 46-2 may be coupled to a termination impedance such as isolated node termination 64 (e.g., the first set of switches SW5-SW8 in FIG. 3 may be omitted). Isolated node termination 64 may have a complex impedance characterized by a corresponding complex reflection coefficient $\Gamma_{T2}$. Isolated node termination 64 may include one or more resistive, capacitive, inductive, and/or switching components that configure isolated node termination 64 to exhibit the impedance characterized by reflection coefficient $\Gamma_{T2}$. The impedance of isolated node termination 64 may be set to configure signal coupler 46-2 to exhibit reference plane R2. If desired, control signal CTRLB may adjust the impedance of isolated node termination 64 to shift the location of reference plane R2 along signal path 40 (as shown by arrow 60). Power detector 62 may measure voltage at port P3 and/or the power associated with the voltage at port P3 (e.g., power detector 62 may convert a radio-frequency voltage waveform into a DC voltage). Control circuitry 14 (FIG. 1) may process the voltage and/or power measured by power detector 62 to measure (e.g., estimate, determine, identify, compute, calculate, generate, sense, etc.) the signal or power wave at reference plane R2. Signal coupler 46-1 may measure the FW signal and/or the RW signal at reference plane R1 (e.g., due to the presence of switches SW1-SW4) concurrently with and independently from measurement of power at reference plane R2 by signal coupler 46-2.

Figure 5:
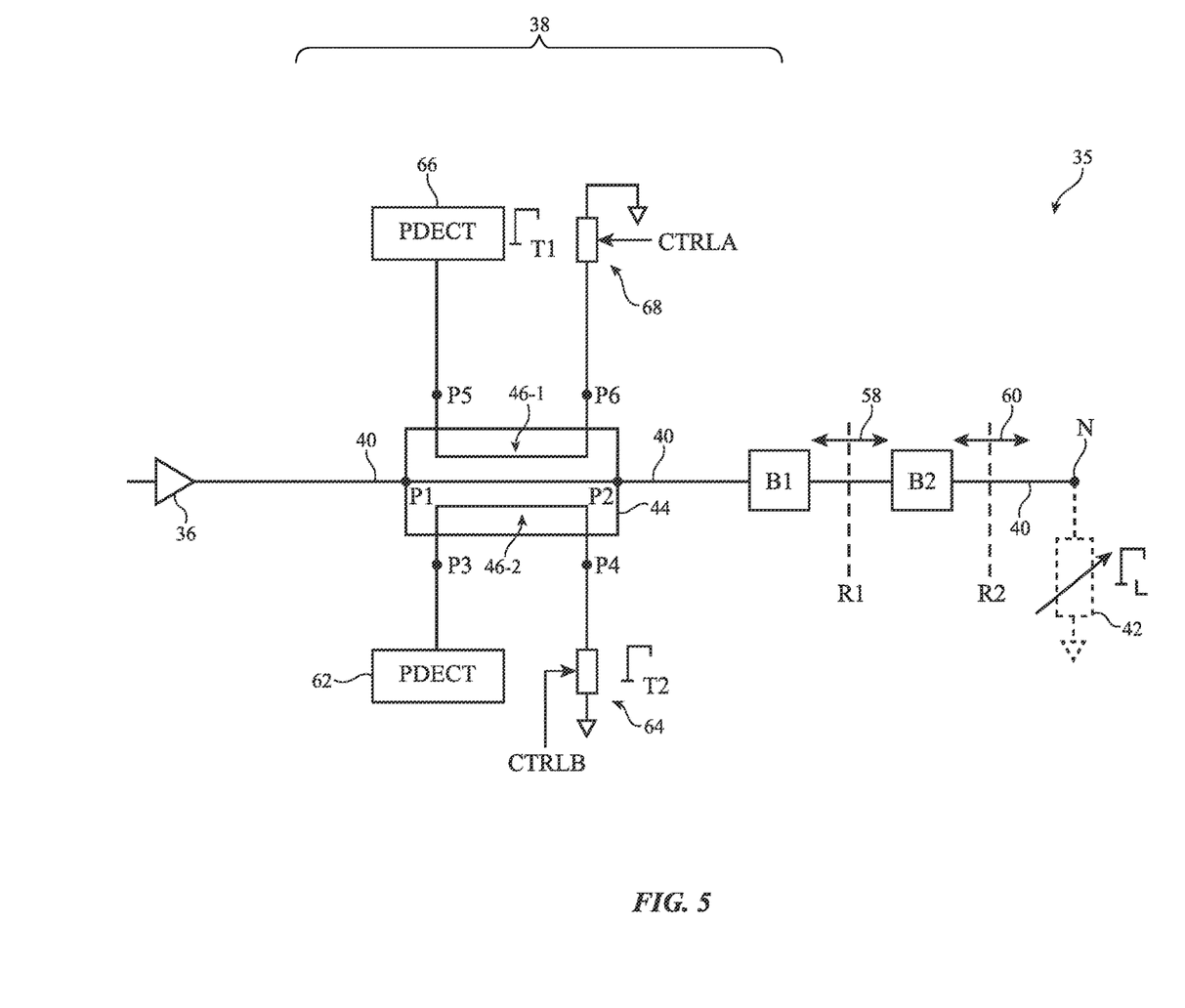
FIG. 5 is a circuit diagram of illustrative multi-coupler circuitry that can concurrently measure a power wave at first and second reference planes along a signal path in accordance with some embodiments.

The example of FIG. 4 in which only signal coupler 46-2 includes a power detector to measure the power (e.g., power wave) at its corresponding reference plane R2 is illustrative. If desired, signal coupler 46-1 may also include a power detector to measure the power wave at its corresponding reference plane R1. FIG. 5 is a circuit diagram showing one example of how signal coupler 46-1 and signal coupler 46-2 may both include power detectors.

As shown in FIG. 5, port P5 of signal coupler 46-1 may be coupled to a power detector such as power detector (PDECT) 66. Port P6 of signal coupler 46-1 may be coupled to a termination impedance such as isolated node termination 68 (e.g., the second set of switches SW1-SW4 of FIGS. 3 and 4 may be omitted). Isolated node termination 68 may have a complex impedance characterized by a corresponding complex reflection coefficient $\Gamma_{T1}$. Isolated node termination 68 may include one or more resistive, capacitive, inductive, and/or switching components that configure isolated node termination 68 to exhibit the impedance characterized by reflection coefficient $\Gamma_{T1}$. The impedance of isolated node termination 68 may be set to configure signal coupler 46-1 to exhibit reference plane R1. If desired, control signal CTRLA may adjust the impedance of isolated node termination 68 to shift the location of reference plane R1 along signal path 40 (as shown by arrow 60). Power detector 62 may measure voltage at port P5 and/or the power associated with the voltage at port P5 (e.g., power detector 66 may convert a radio-frequency frequency voltage waveform into a DC voltage). Control circuitry 14 (FIG. 1) may process the voltage and/or power measured by power detector 62 to measure (e.g., estimate, determine, identify, compute, calculate, generate, sense, etc.) the signal or power wave at reference plane R1. Signal coupler 46-1 may measure power at reference plane R1 concurrently with and independently from measurement of power at reference plane R2 by signal coupler 46-2.

If care is not taken, measurements made using multi-coupler 44 may undesirably vary as the reflection coefficient of one or more components along signal path 40 varies. These variations can reduce the accuracy of the measurements made by power detectors 62 and/or 66, thereby reducing accuracy in how device 10 characterizes the performance of signal path 40. To mitigate these issues, isolated node termination 64 of FIGS. 4 and 5 may be configured to exhibit a particular complex impedance that is characterized by reflection coefficient $\Gamma_{T2}=\Gamma_{TSSI,2}$. Similarly, isolated node termination 68 of FIG. 5 may be configured to exhibit a particular complex impedance that is characterized by reflection coefficient $\Gamma_{T1}=\Gamma_{TSSI,1}$. In other words, isolated node termination 64 may include capacitive, resistive, switching, inductive, and/or other circuit components arranged in a manner (e.g., in series, in parallel, with respect to ground, etc.) that configure isolated node termination 64 to exhibit a reflection coefficient $\Gamma_{T,2}=\Gamma_{TSSI,2}$. Similarly, isolated node termination 68 may include capacitive, resistive, switching, inductive, and/or other circuit components arranged in a manner (e.g., in series, in parallel, with respect to ground, etc.) that configure isolated node termination 68 to exhibit a reflection coefficient $\Gamma_{T,1}=\Gamma_{TSSI,1}$.

The reflected and incident power waves at the ports signal coupler 46-1 may be characterized by sixteen scattering parameters or S-parameters for a fixed frequency, which are complex numbers associated with the four-port network model of signal coupler circuitry 38 (e.g., where the first (input) port is defined by port P1, the second (output) port is defined by port P2, the third port is defined by port P5, and the fourth port is defined by port P6). The S-parameters include: $S_{11}$ (e.g., a reflection coefficient at the input port), $S_{12}$ (e.g., characterizing reverse voltage gain), $S_{13}$, $S_{14}$, $S_{21}$ (e.g., characterizing forward voltage gain), $S_{22}$ (e.g., a reflection coefficient at the output port), $S_{23}$, $S_{24}$, $S_{31}$, $S_{32}$, $S_{33}$, $S_{34}$, $S_{41}$, $S_{42}$, $S_{43}$, and $S_{44}$. The circuit components of isolated node termination 68 may be selected such that isolated node termination 68 exhibits an impedance characterized by a reflection coefficient $\Gamma_{T1}=\Gamma_{TSSI,1}$, where $\Gamma_{TSSI,1}$ is given by equation 1.

$$\Gamma_{TSSI,1} = \frac{S_{21}S_{32} - S_{22}S_{31}}{S_{21}(S_{32}S_{44} - S_{34}S_{42}) + S_{22}(S_{34}S_{41} - S_{31}S_{44}) + S_{24}(S_{31}S_{42} - S_{32}S_{41})} \quad (1)$$

In other words, reflection coefficient $\Gamma_{TSSI,1}$ is a function of each of the S-parameters (with respect to reference plane R1) except for $S_{11}$, $S_{12}$, $S_{13}$, $S_{14}$, $S_{23}$, $S_{33}$, and $S_{43}$. The numerator of reflection coefficient $\Gamma_{TSSI,1}$ is a function of $S_{21}$, $S_{32}$, $S_{22}$, and $S_{31}$ (for reference plane R1). The denominator of reflection coefficient $\Gamma_{TSSI,1}$ is a function of $S_{21}$, $S_{32}$, $S_{44}$, $S_{34}$, $S_{42}$, $S_{22}$, $S_{41}$, $S_{31}$, $S_{24}$, and $S_{42}$ (for reference plane R1). This configures the voltage at port P5 and into power detector 66 and its corresponding power to track the amplitude (magnitude) of the FW signal (power wave) at reference plane R1 to within a constant value that does not change as the impedance at reference plane R1 changes over time. Similarly, for signal coupler 46-2, port P3 may take the place of port P5 and port P4 may take the place of port P6 in the four-port network model, and isolated node termination 64 may have an impedance selected such that isolated node termination 64 exhibits an impedance characterized by a reflection coefficient $\Gamma_{T2}=\Gamma_{TSSI,2}$, where $\Gamma_{TSSI,2}$ is given by the right side of equation 1 and where the scattering parameters in equation 1 are taken with respect to reference plane R2. This configures the voltage at port P3 and into power detector 62 and its corresponding power to track the amplitude (magnitude) of the FW signal (power wave) at reference plane R2 to within a constant value that does not change as the impedance at reference plane R2 changes over time.

If desired, multi-coupler 44 of FIGS. 3-5 may include one or more additional signal couplers 46 for characterizing one or more reference planes (e.g., reference planes R3 and/or R4 of FIG. 2) in addition to reference planes R1 and R2. It may be desirable to maximize isolation between each of the signal couplers 46 in multi-coupler 44 (e.g., to allow for concurrent and independent measurement of multiple reference planes along signal path 40). Minimizing the coupling factors of the signal couplers may help to maximize isolation between the signal couplers. If desired, isolation between the signal couplers may be maximized by distributing the signal couplers across multiple metallization layers on a substrate.

Figure 6:
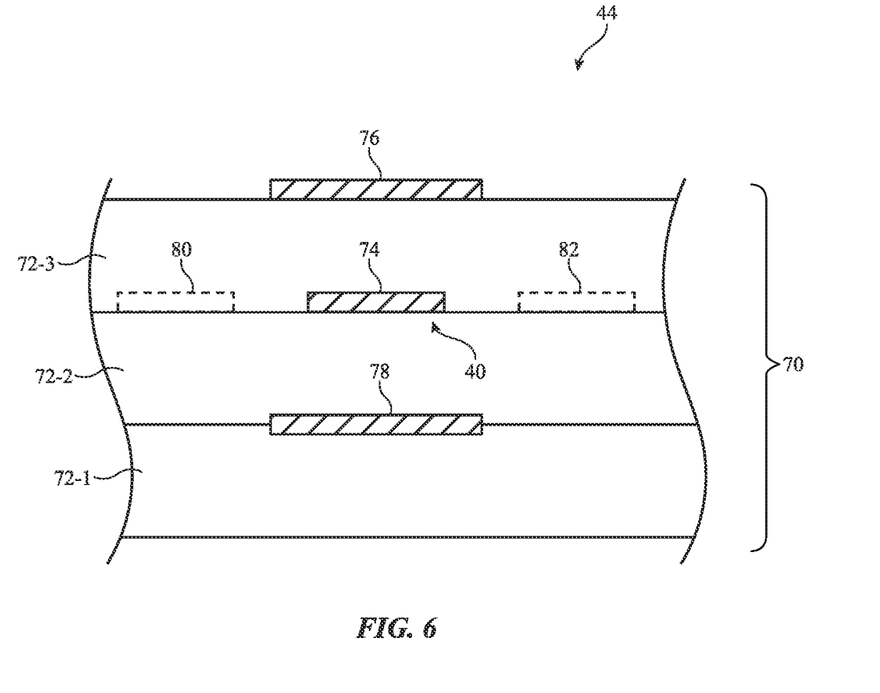
FIG. 6 is a cross-sectional side view showing how an illustrative multi-coupler may be distributed across multiple metallization layers on a substrate to maximize isolation between signal couplers within the multi-coupler in accordance with some embodiments.

FIG. 6 is a cross-sectional side view showing one example of how signal couplers 46 may be distributed across multiple metallization layers on a substrate. As shown in FIG. 6, multi-coupler 44 may be disposed on a substrate 70. Substrate 70 may include multiple stacked dielectric layers 72 (e.g., at least a first dielectric layer 72-1, a second dielectric layer 72-2, and a third dielectric layer 72-3). Dielectric layers 72 may be, for example, layers of rigid or flexible printed circuit board material (e.g., polyimide), ceramic, plastic, or other materials.

Multi-coupler 44 may include a first metallization layer patterned onto dielectric layer 72-1, a second metallization layer patterned onto dielectric layer 72-2, and a third metallization layer patterned onto dielectric layer 72-3. The first metallization layer may include conductive traces 78. The second dielectric layer may include conductive traces 74, 80, and/or 82. The third metallization layer may include conductive traces 76. Conductive traces 74 may form signal path 40 (e.g., the signal conductor of signal path 40 in implementations where signal path 40 is a radio-frequency transmission line). Conductive traces 76 may form signal coupler 46-1 and conductive traces 78 may form signal coupler 46-2 of multi-coupler 44. Forming signal couplers 46-1 and 46-2 from metallization layers on opposing sides of the metallization layer used to form signal path 40 in this way may serve to maximize isolation between signal couplers 46-1 and 46-2, which may allow for accurate and concurrent measurement of reference planes R1 and R2 along signal path 40.

If desired, conductive traces 80 may be used to form a third signal coupler and/or conductive traces 82 may be used to form a fourth signal coupler in multi-coupler 44. An arrangement of this type may allow concurrent characterization of up to four reference planes along signal path 40 (e.g., reference planes R1-R4 of FIG. 2) with maximum isolation between the signal couplers and while occupying a minimal amount of space in device 10. The example of FIG. 6 in which conductive traces 76 and 78 are used to form respective signal couplers 46-1 and 46-2 is illustrative. In general, any of conductive traces 76-82 may be used to form signal couplers 46-1 and 46-2 (e.g., signal coupler 46-1 may be formed from conductive traces 80 whereas signal coupler 46-2 is formed from conductive traces 82, signal coupler 46-1 may be formed from conductive traces 76 whereas signal coupler 46-2 is formed from conductive traces 80, etc.).

Figure 7:
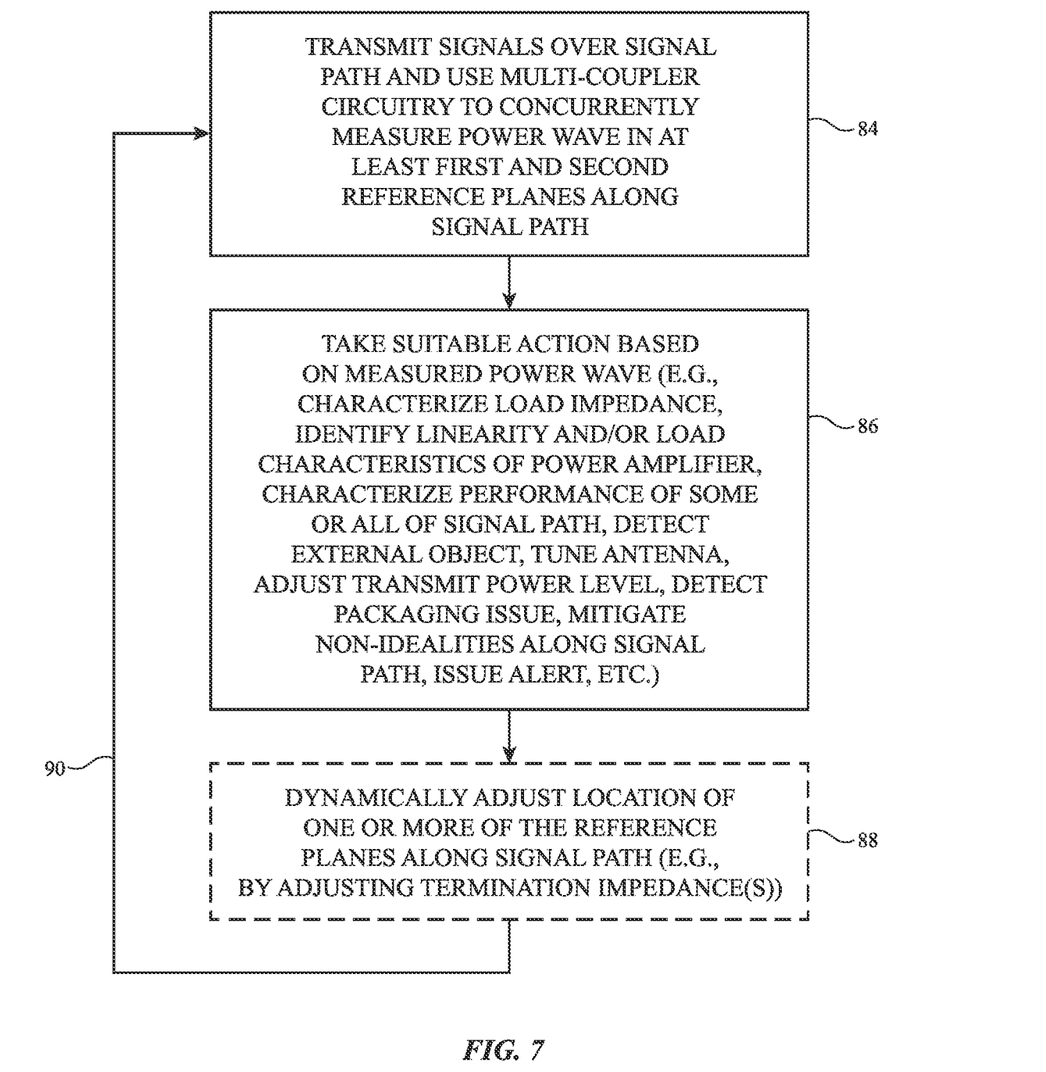
FIG. 7 is a flow chart of illustrative operations that may be performed by an electronic device to concurrently characterize multiple reference planes along a signal path using multi-coupler circuitry in accordance with some embodiments.

FIG. 7 is a flow chart of illustrative operations that may be performed by device 10 for gathering and processing measurements using multi-coupler circuitry 38 of FIGS. 3-6. At operation 84, signal source 36 may transmit signals on signal path 40. Each signal coupler 46 in multi-coupler circuitry 38 may concurrently couple some of the signals off of signal path 40 via its respective coupled node (port). Each signal coupler may concurrently (e.g., simultaneously) measure a power wave (e.g., using a corresponding power detector) or FW/RW signals (e.g., using a corresponding receiver 56) at a respective reference plane R (e.g., at a respective point) along signal path 40. The reference planes for each signal coupler are determined by the termination(s) of the signal coupler. Using different signal couplers with different terminations within multi-coupler circuitry 38 may allow different reference planes to be concurrently measured. Distributing the signal couplers across metallization layers (e.g., as shown in FIG. 6) may maximize isolation between the signal couplers to help the signal couplers perform accurate measurements.

At operation 86, control circuitry 14 may perform any desired operations based on the measured power or signal waves measured using multi-coupler circuitry 38. For example, control circuitry 14 may use the measurements concurrently gathered from each of the reference planes to identify (e.g., characterize, compute, calculate, determine, detect, etc.) the impedance at one or more of the reference planes, to identify the magnitude of power wave at one or more of the reference planes, to identify the linearity of one or more components (e.g., circuit blocks B) along signal path 40, to identify the linearity or other characteristics of signal source 36 (e.g., along with measurements to the input of signal source 36), to characterize the overall performance of some or all of signal path 40 (e.g., of one or more circuit blocks B), to detect external object 37 (FIG. 2), to detect non-idealities (e.g., deviations from nominal or expected performance) or errors in one or more of the components (e.g., circuit blocks B) along signal path 40, to detect when a mechanical fault of packaging issue is present along signal path 40 (e.g., in examples where signal path 40 extends between integrated circuits, chips, circuit boards, or packages), to issue an alert when a non-ideality or error is detected, to flag some or all of signal path 40 for debugging or repair when a non-ideality or error is detected, etc. If desired, control circuitry 14 may adjust the operation of one or more components along signal path 40 based on one or more of these quantities and/or the measurements concurrently gathered from each of the reference planes. For example, control circuitry 14 may adjust the transmit power level of signal source 36, may adjust the operation of one or more circuit blocks B, may adjust how one or more circuit blocks B interact with the signals transmitted along signal path 40, may adjust the tuning or impedance matching of an antenna coupled to output node N, may perform operations to mitigate non-idealities or errors detected along signal path 40, etc.

At optional operation 88, control circuitry 14 (FIG. 1) may use control signals CTRL (FIG. 2) to dynamically adjust, change, or shift the location of one or more of the reference planes R of multi-coupler circuitry 38. The control signals may, for example, adjust the impedance of one or more terminations of one or more of the signal couplers in multi-coupler circuitry 38. Processing may subsequently loop back to operation 84 via path 90 to concurrently gather measurements from the updated reference plane(s). In this way, control circuitry 14 may concurrently measure and characterize multiple reference planes along signal path 40 and may adjust the reference planes to characterize some or all of the signal path over time. Operation 88 may be omitted if desired. In these implementations, processing may loop back to operation 84 from operation 86.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The methods and operations described above in connection with FIGS. 1-7 may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., storage circuitry 16 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., processing circuitry 18 of FIG. 1, etc.). The processing circuitry may include microprocessors, central processing units (CPUs), application-specific integrated circuits with processing circuitry, or other processing circuitry.

The foregoing is illustrative and various modifications can be made to the described embodiments. The foregoing embodiments may be implemented individually or in any combination.

What is claimed is:

1. Wireless circuitry comprising:
   a substrate having a first layer, a second layer, and a third layer, the second layer being interposed between the first layer and the third layer;
   a radio-frequency transmission line having a signal conductor formed from a first conductive trace on the second layer;
   a first signal coupler that includes a second conductive trace on the first layer and overlapping a segment of the first conductive trace on the second layer; and
   a second signal coupler that includes a third conductive trace on the third layer and overlapping the segment of the first conductive trace on the second layer.

2. The wireless circuitry of claim 1, further comprising:
   a third signal coupler that includes a fourth conductive trace on the second layer and overlapping the segment of the first conductive trace.

3. The wireless circuitry of claim 2, further comprising:
   a fourth signal coupler that includes a fifth conductive trace on the second layer, the segment of the first conductive trace being interposed between the fourth conductive trace and the fifth conductive trace.

4. The wireless circuitry of claim 1, wherein the first signal coupler has a first termination coupled to the second conductive trace, the first termination has a first impedance, the second signal coupler has a second termination coupled to the third conductive trace, and the second termination has a second impedance different from the first impedance.

5. The wireless circuitry of claim 4, further comprising:
   one or more processors configured to measure a power wave at a first reference plane along the signal conductor using the first signal coupler and configured to concurrently measure a power wave at a second reference plane along the signal conductor using the second signal coupler, the second reference plane being different from the first reference plane.

6. The wireless circuitry of claim 1, wherein the first signal coupler comprises:
   a first coupled node coupled to the second conductive trace;
   a first isolated node coupled to the second conductive trace;
   a first termination with a first impedance coupled to the second conductive trace;
   a first receiver; and
   first switching circuitry that switchably couples the first coupled node and the first isolated node to the first receiver and the first termination.

7. The wireless circuitry of claim 6, wherein the second signal coupler comprises:
   a second coupled node coupled to the third conductive trace;
   a second isolated node coupled to the third conductive trace;
   a second termination with a second impedance coupled to the third conductive trace;
   a second receiver; and
   second switching circuitry that switchably couples the second coupled node and the second isolated node to the second receiver and the second termination.

8. The wireless circuitry of claim 7, wherein the first impedance and the second impedance are adjustable.

9. The wireless circuitry of claim 1, wherein the first signal coupler comprises:
   a first coupled node;
   a first isolated node;
   a first termination coupled to the first isolated node and having a first impedance; and
   a first power detector coupled to the first coupled node.

10. The wireless circuitry of claim 9, wherein the second signal coupler comprises:
    a second coupled node;
    a second isolated node;
    a second termination coupled to the second isolated node and having a second impedance different from the first impedance; and
    a second power detector coupled to the second coupled node.

11. Signal transmission circuitry comprising:
    a substrate having a first dielectric layer;
    a first conductive trace on the first dielectric layer and configured to convey a radio-frequency signal;
    a first signal coupler that includes a second conductive trace on the first dielectric layer and overlapping a segment of the first conductive trace; and
    a second signal coupler that includes a third conductive trace on the first dielectric layer, the segment of the first conductive trace being interposed between the second conductive trace and the third conductive trace.

12. The signal transmission circuitry of claim 11, wherein the substrate has a second dielectric layer stacked on the first dielectric layer, the signal transmission circuitry further comprising:
    a third signal coupler that includes a fourth conductive trace on the second dielectric layer and overlapping the segment of the first conductive trace.

13. The signal transmission circuitry of claim 12, wherein the substrate has a third dielectric layer, the first dielectric layer is stacked on the third dielectric layer, and the signal transmission circuitry further comprises:
    a fourth signal coupler that includes a fifth conductive trace on the third dielectric layer and overlapping the segment of the first conductive trace.

14. The signal transmission circuitry of claim 11, wherein the first signal coupler comprises:
    a first coupled node coupled to the second conductive trace;
    a first isolated node coupled to the second conductive trace;
    a first termination with a first impedance coupled to the second conductive trace;
    a first receiver; and
    first switching circuitry that switchably couples the first coupled node and the first isolated node to the first receiver and the first termination.

15. The signal transmission circuitry of claim 14, wherein the second signal coupler comprises:
    a second coupled node coupled to the third conductive trace;
    a second isolated node coupled to the third conductive trace;
    a second termination with a second impedance coupled to the third conductive trace;
    a second receiver; and second switching circuitry that switchably couples the second coupled node and the second isolated node to the second receiver and the second termination, the first impedance being adjustable to shift a first reference plane of the first signal coupler and the second impedance being adjustable to shift a second reference plane of the second signal coupler.

16. The wireless circuitry of claim 11, wherein the first signal coupler comprises:
   a first coupled node;
   a first isolated node;
   a first termination coupled to the first isolated node and having a first impedance; and
   a first power detector coupled to the first coupled node, the second signal coupler including
      a second coupled node;
      a second isolated node;
      a second termination coupled to the second isolated node and having a second impedance different from the first impedance; and
      a second power detector coupled to the second coupled node.

17. Wireless circuitry comprising:
   a substrate having a first dielectric layer, a second dielectric layer stacked on the first dielectric layer, and a third dielectric layer stacked on the second dielectric layer;
   a first conductive trace on the second dielectric layer and configured to convey a radio-frequency signal;
   a first signal coupler that includes a second conductive trace on the first dielectric layer and overlapping a segment of the first conductive trace; and
   a second signal coupler that includes a third conductive trace on the second dielectric layer and overlapping the segment of the first conductive trace.

18. The wireless circuitry of claim 17, wherein the first signal coupler comprises:
   a first coupled node coupled to the second conductive trace;
   a first isolated node coupled to the second conductive trace;
   a first termination with a first impedance coupled to the second conductive trace;
   a first receiver; and
   first switching circuitry that switchably couples the first coupled node and the first isolated node to the first receiver and the first termination.

19. The wireless circuitry of claim 18, wherein the second signal coupler comprises:
   a second coupled node coupled to the third conductive trace;
   a second isolated node coupled to the third conductive trace;
   a second termination with a second impedance coupled to the third conductive trace;
   a second receiver; and
   second switching circuitry that switchably couples the second coupled node and the second isolated node to the second receiver and the second termination, the first impedance being adjustable to shift a first reference plane of the first signal coupler and the second impedance being adjustable to shift a second reference plane of the second signal coupler.

20. The wireless circuitry of claim 17, wherein the first signal coupler comprises:
   a first coupled node;
   a first isolated node;
   a first termination coupled to the first isolated node and having a first impedance; and
   a first power detector coupled to the first coupled node, the second signal coupler including
      a second coupled node;
      a second isolated node;
      a second termination coupled to the second isolated node and having a second impedance different from the first impedance; and
      a second power detector coupled to the second coupled node.

* * * * *